March 3, 1936.  W. W. SLOANE  2,032,599
SHAKER CONVEYER
Filed March 7, 1934  2 Sheets-Sheet 1
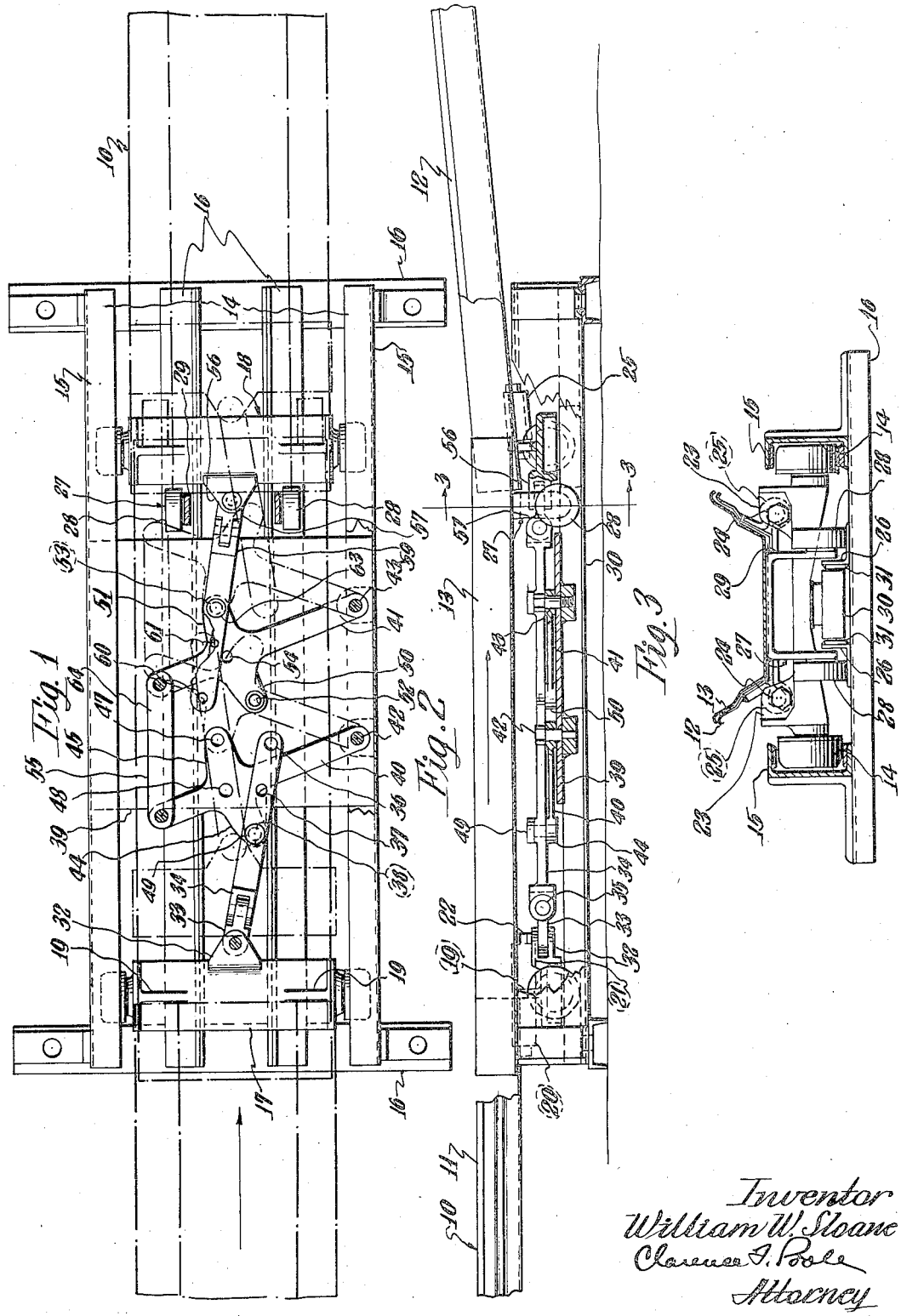
Inventor
William W. Sloane
Clarence T. Poole
Attorney March 3, 1936.  W. W. SLOANE  2,032,599
SHAKER CONVEYER
Filed March 7, 1934   2 Sheets-Sheet 2
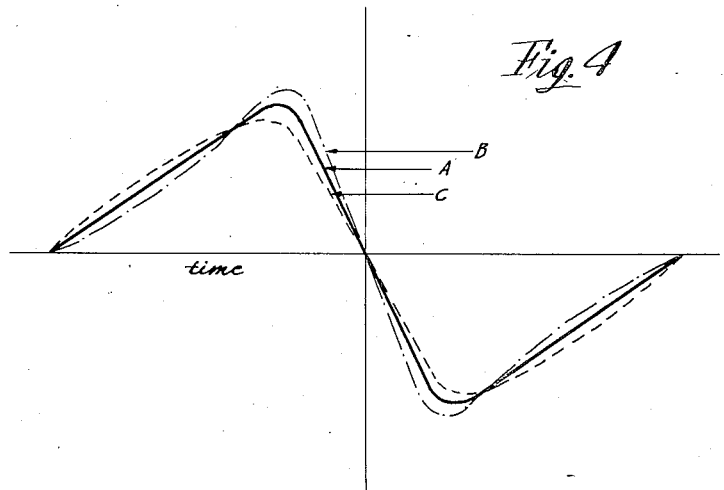
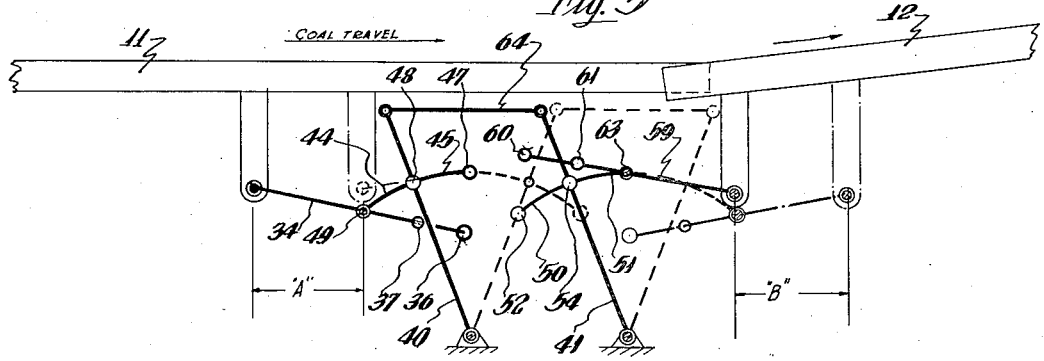
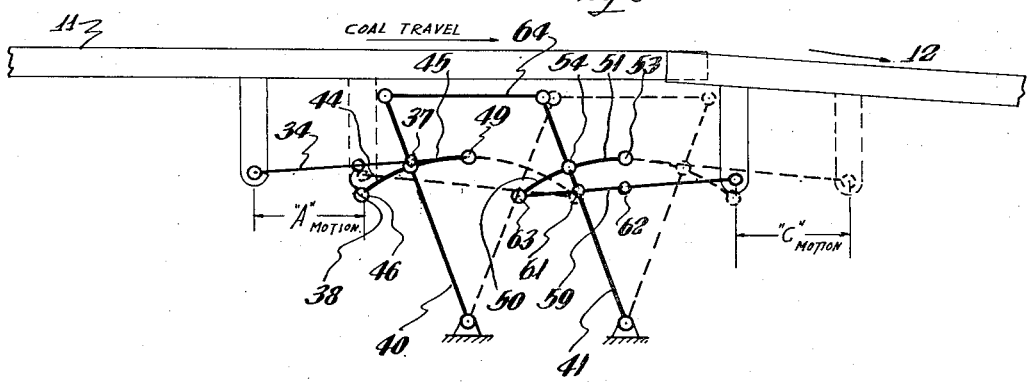
Inventor
William W. Sloane
Clarence F. Poole
Attorney Patented Mar. 3, 1936

2,032,599

UNITED STATES PATENT OFFICE 2,032,599

SHAKER CONVEYER

William W. Sloane, Chicago, Ill., assignor to Goodman Manufacturing Company, Chicago, Ill., a corporation of Illinois Application March 7, 1934, Serial No. 714,428

15 Claims. (Cl. 198—220)

This invention relates to improvements in shaker conveyers and has as its principal objects to provide a mechanism wherein one conveyer trough in a shaker conveyer pan line may be connected for driving another trough or portion of the pan line in such a manner that the drive motion of the second trough may be different than that of the first trough.

In shaker conveyer pan lines a portion of the pan line is frequently on the level and the remainder of the pan line is arranged to convey material up or down a grade. The result is that when the entire pan line is driven from one drive mechanism at one motion suitable for conveying material along the level, the rate of travel of material along the inclined portion of the pan line is retarded or accelerated to an undesirable degree depending upon whether the inclined portion of the pan line is up or down grade. The device of my invention is so arranged as to overcome these difficulties and convey material along the entire pan line at a substantially uniform rate regardless of the fact that one section of the pan line is inclined up or down a grade while another section of the pan line is along the level.

Other objects of my invention will appear from time to time as the following specification proceeds.

My invention may be more clearly understood with reference to the accompanying drawings wherein:

Figure 1 is a detail fragmentary plan view of a device embodying my invention, with parts broken away and in section;

Figure 2 is a side elevation of the device shown in Figure 1 with parts broken away and shown in vertical section to more clearly show certain details thereof;

Figure 3 is a sectional view taken substantially along line 3—3 of Figure 2;

Figure 4 is a diagrammatic view showing several hypothetical velocity curves of the device embodying my invention;

Figure 5 is a view diagrammatically illustrating the arrangement of the mechanism in instances where the inclination of the pan line changes from a level to an upgrade;

Figure 6 is a view diagrammatically illustrating the arrangement of the mechanism in instances where the inclination of the pan line changes from a level to a down grade.

Like reference characters refer to like parts throughout the various figures.

With reference now in particular to the drawings and the details of the embodiment of my invention illustrated, a conveyer pan line 10 is provided which includes a trough section 11, another trough section 12 adapted to be driven from said first-mentioned trough section, and angularly movable with respect to first-mentioned trough section in a vertical plane, and a connecting trough 13 connecting the trough sections 11 and 12 together.

The trough sections 11, 12 and 13 are guided for reciprocable movement in a guide frame indicated by reference character 14, which includes a pair of longitudinally extending inwardly facing channel members 15, 15 secured adjacent their ends to cross members 16, 16 in a suitable manner, which cross members are adapted to rest upon a mine bottom and be held in a stationary position with respect thereto by means of suitable jacks (not shown) adapted to be interposed between said cross members and the mine roof. Suitable bearing members are provided on the inside of the inwardly facing flanges of the channel members 15, 15 to form a guide means for rollers of roller frames 17 and 18 in such a manner that said roller frames may be reciprocably moved along said guide frame a distance equal to the stroke of the pan line.

The roller frame 17 forms a support for the trough 11 and has a pair of upstanding flanges 19, 19 adapted to be interposed between elongated eyes 20 and 21 extending laterally and downwardly from the trough section 11 and connecting trough section 13, which trough section is herein shown as being nested within the trough section 11. The roller frame 17 is adapted to be secured to the trough sections 11 and 13 by means of suitable connecting bolts 22, 22 passing through the eyes 20 and 21 and apertures in the flanges 19.

The forward end of the connecting trough section 13 is herein shown as being nested within the rearward end of the trough section 12 and is slidably movable with respect to said trough section.

The roller frame 18 is provided with a pair of upstanding flanges 23, 23 adapted to be connected with the rearward end of the trough section 12 by means of suitable connecting bolts 24, 24 loosely carried in suitable apertures in the flanges 23, 23 and passing through elongated eyes 25, 25 depending and extending laterally from the bottom of the trough section 12. The connection between the roller frame 18 and trough section 12 is such that said trough section may be pivotally moved with respect to said roller frame in a vertical plane.

A pair of parallel spaced angles 26, 26 is secured to the cross members 16, 16 in such a manner that the bottom legs thereof extend in a substantially horizontal plane away from the longitudinal center line of the guide frame 14. Said angles are spaced inwardly of channel members 15, 15 and form a guide means for a roller frame 27 which supports the forward portion of the connecting trough 13 and permits said trough to move relative to the trough 12. The roller frame 27 includes a pair of rollers 28, 28 which ride on the horizontal legs of the angles 26, 26. A frame member 29 connects said rollers together and is adapted to be secured to the under portion of the connecting trough section 13 in a suitable manner. A guide member 30 depends from the central portion of the frame member 29. The guide member 30 is of a rectangular form and its sides are adapted to have engagement with bearing members 31, 31 secured to the insides of the vertical legs of the angles 26, 26. Thus, the roller frame 27 forms a guide support for the connecting trough section 13, permits said trough to move relative to the trough 12 and holds said connecting trough section from lateral displacement with respect to the trough section 12. Moreover, the trough sections 11 and 12 are connected together in such a manner that material may be discharged from one trough section to another while said trough sections move relative to each other and are disposed at various angular relations with respect to each other.

With reference now in particular to the mechanism for driving the trough section 12 from the trough section 11 and several other novel features of my invention, a yoke 32 is herein shown as being formed integral with and extending forwardly of the roller frame 17. The yoke 32 is adapted to form a connection for a connecting member 33 to permit said connecting member to be pivotally moved with respect thereto about a vertical axis. A link 34 is pivotally connected to the connecting member 33 for pivotal movement with respect thereto about a horizontal axis by a pivotal pin 35. The link 34 is provided with a plurality of spaced apertures, indicated by reference characters 36, 37 and 38, spaced inwardly from the outer end thereof in the order enumerated. A supporting plate 39 is secured to the inward face of the channel members 15, 15 above the bottom thereof and intermediate the ends thereof and forms a horizontal support for a pair of spaced rocking members 40 and 41. The rocking members 40 and 41 are pivotally mounted on the upper surface of the supporting plate 39 by means of pivotal pins 42 and 43, respectively, in such a manner that said rocking members may be supported by and rocked with respect to said plate.

The rocking member 41 is provided with a pair of arms 44 and 45 extending laterally from each side of its longitudinal center line and herein shown as being disposed intermediate the ends of said rocking member. An aperture 46 is provided adjacent the outer end of the arm 44. Likewise, an aperture 47 is provided adjacent the opposite outer end of arm 45 and an aperture 48 is provided adjacent the longitudinal center line of the rocking member 40. The apertures 46, 47 and 48 as herein shown are arranged on a common arc subscribed by a radius moving about a center coaxial with the axis of pivotal movement of the rocking member 40 and form a means for connecting the connecting link 34 thereto in such a manner that the rocking member 40 may be rocked by the trough section 11. As shown in Figures 1 and 2, the aperture 38 is registered with the aperture 46 and the connecting link 34 is pivotally connected to the rocking member 40 by means of a pivotal pin 49 passing through said apertures in a suitable manner.

The rocking member 41 is likewise provided with laterally extending arms 50 and 51 disposed intermediate its ends, which arms are provided with apertures 52 and 53, respectively, adjacent their outer ends. The rocking member 41 is also provided with an aperture 54 adjacent its longitudinal center lines and arranged on an arc passing through the center of the apertures 52 and 53.

An integral yoke 56 extends rearwardly from the central portion of the roller frame 18 and has a connecting member 57 pivotally carried thereby for pivotal movement with respect thereto about a vertical axis. The connecting member 57 has a link 59 connected thereto for pivotal movement with respect thereto about a horizontal axis.

A link 59 is provided with apertures 60, 61 and 62 spaced inwardly from its outer end in the order enumerated, which apertures are adapted to register with certain of the apertures 52, 53 or 54 and form a means for connecting said connecting link with the rocking member 41 in various ways in order that said rocking member may impart the desired motion to said connecting link. As shown in Figure 1, the aperture 62 is registered with the aperture 53 and is connected thereto by means of a pivotal pin 63.

Suitable means are provided for connecting the rocking members 40 and 41 together so that one rocking member may be rocked by the other. Said means as herein shown comprises a connecting link 55 which connects said rocking members so as to rock in parallel relation with respect to each other.

It is thus apparent that reciprocable movement of the trough section 11 may rock the rocking members 40 and 41 which rocking members in turn may reciprocably move the trough section 12. The angular relationship of the points of connection of the connecting links 34 and 59 with respect to the respective rocking members 40 and 41 may be so arranged that the conveying motion of the trough section 12 may be different than the conveying motion of the trough section 11, although the time for making the stroke of both trough sections is the same, and if desired the angular relationship of the points of connection of said connecting links to said rocking members may be such that the conveying movement of the trough section 12 will be the same as the conveying movement of the trough section 11. When the troughs are arranged in the last-mentioned manner, the aperture 37 of the connecting link 34 registers with the aperture 38 of the rocking member 40 and said members are pivotally connected together by means of the pivotal pin 49. Likewise, the aperture 60 of the connecting link 59 registers with the aperture 54 of the rocking member 41 and said connecting and rocking members are pivotally connected together by the pivotal pin 63.

With reference now in particular to Figures 4, 5 and 6 illustrating diagrammatically the various connections between the conveyer troughs and the velocity curves of said troughs when connected in various relationships with respect to each other, the velocity curve indicated by reference character A in Figure 4 illustrates an effective motion for conveying coal along the level. The characteristics of this curve and the other curves herein illustrated will not herein be set forth in detail since they have been clearly set forth in a prior application Serial No. 668,897, filed by me on May 1, 1933.

When conveying material along the level the trough section 11 is usually driven by a motion similar to the motion indicated by curve A and when the trough section 12 and remainder of the pan line is arranged to convey material along the level, said trough section is preferably driven by the trough section 11 in such a manner that its conveying motion will be substantially the same as the conveying motion of the trough section 11. The connections for effecting the same drive motion to the trough 12 from the trough 11 have hereinbefore been fully described so will not be described again.

When the trough section 12 and remainder of the pan line is inclined upwardly with respect to the trough section 11 it is necessary that the conveying motion of the inclined portion of the pan line be more violent than the level portion of the pan line in order that the travel of material going up grade will not be retarded.

In order to increase the conveying effect of the inclined portion of the pan line, the connecting links 34 and 59 are pivotally connected to the respective rocking members 40 and 41 in the manner herein before clearly described with reference to Figure 1. The angular relationship between the points of connection of the connecting link 34 to the rocking member 40 and the rocking member 41 to the connecting link 59, is such that the points of connection of said connecting links to said rocking members are offset laterally in opposite directions from the longitudinal center lines of the members 40 and 41. The relationship between these points of connection may be determined mathematically in a manner which need not herein be described. With such an arrangement the conveyer trough 12 is driven by the conveyer trough 11 in such a manner that the rate of acceleration and deceleration of the forward stroke of said trough section and inclined portion of the pan line is increased with the result that the rate of reversal of this portion of the pan line at the end of the forward stroke is more violent than in the motion illustrated by curve A. This more violent motion is indicated by curve B in Figure 4 and is such that the travel of coal up an average grade may be the same as along the level when the conveyer trough 11 is driven by the motion indicated by curve A under similar conditions.

In Figure 6 the connecting links 34 and 59 are diagrammatically shown as being so arranged with respect to the rocking members 40 and 41 that the connecting link may be connected to the lever arm 45 of the rocking member 40 by the pivotal pin 49 registering with the apertures 36 and 47, and the connecting link 59 may be connected to the lever arm 50 of the rocking member 41 by the pivotal pin registering with the aperture 60 and 52. With such an arrangement the trough section 12 may be driven by a motion indicated by curve C in Figure 4. The acceleration of the motion indicated by curve C is less than that indicated by curves A and B and the rate of reversal at the end of the forward stroke is correspondingly decreased. Thus, the coal travel along the trough section 12 is less than if driven by curves A or B. Such a motion is suitable for moving material down a grade when it is desired that the rate of travel of the material be the same as along the level in order to prevent overloading of the main conveyer or prevent the speed of travel of the material down grade from getting out of control.

It may now be seen that a new and improved mechanism has been provided wherein one conveyer trough or section of a pan line may be driven from another conveyer trough or section of a pan line at a different conveying motion than the conveying motion of the driving trough; that the drive motion of the first conveyer trough is effected by means of a simple system of links and levers in such a manner that the speed of movement of the material along the pan line may be substantially constant for the entire length of the pan line notwithstanding the fact that a portion of the pan line may be inclined upwardly or downwardly while the rest of the pan line is arranged along the level.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a shaker conveyer, a conveyer pan line including two conveyer troughs adapted to be disposed at different inclinations with respect to each other, and means connected to and driven by one of said troughs for driving said other trough and changing the violence of the conveying action thereof comprising a rocking member having an arm extending therefrom, a link pivotally connected between said arm and one of said trough sections for rocking said rocking member and a fixed pivotal connection between said rocking member and other conveyer trough intersecting the longest axis of said rocking member.

2. In a shaker conveyer, a conveyer pan line including two conveyer troughs adapted to be disposed at different inclinations with respect to each other, and means connected to and driven by one of said troughs for driving said other trough and changing the violence of the conveying action thereof comprising a rocking member having an arm extending therefrom in a direction away from its longitudinal center line, a drive connection from one of said conveyer troughs to said arm, another rocking member, a connection between said rocking members, said second-mentioned rocking member having an arm extending laterally therefrom in an opposite direction from its longitudinal center line than said first-mentioned arm extends from said first-mentioned rocking member, and an operative connection between said last-mentioned arm and said other conveyer trough.

3. In a shaker conveyer, a conveyer trough, a second conveyer trough, and a connection between said troughs, whereby the second trough may be reciprocably driven by the first trough at a different conveying action than the conveying action of said first-mentioned trough including a pair of parallel links mounted for pivotal movement about a pair of fixed parallel-spaced axes, a link connecting said links together for parallel movement with respect to each other, a link connecting one of said conveyer troughs with one of said links at a point spaced laterally from a line intersecting the fixed pivotal axis thereof and the axis of pivotal connection of said first-mentioned link thereto, and a connection from said other parallel link to said other conveyer trough for reciprocably driving said conveyer trough.

4. In a shaker conveyer, a pair of conveyer troughs, and a connection between said troughs whereby one trough may be reciprocably driven by the other trough at a different conveying action than the conveying action of the driving conveyer trough including a pair of rocking members, a link pivotally connecting said rocking members together for parallel movement with respect to each other, a connection from said driving conveyer trough to one of said rocking members at a point spaced laterally from a line intersecting the pivotal axis of said rocking member and the axis of pivotal connection of said first-mentioned link thereto, and a drive connection from said other rocking member to said driven conveyer trough.

5. In a shaker conveyer, a pair of conveyer troughs, and a connection between said conveyer troughs whereby one trough may be reciprocably driven from the other at a different conveying action than the conveying action of said driving conveyer trough comprising a stationary frame forming a supporting guide frame for each of said conveyer troughs, a rocking member pivoted to said frame for movement about a vertical axis, a link connecting one of said troughs with said rocking member at a point offset laterally from its longest axis and a connection from said rocking member to said other conveyer trough including a link pivotally connected to said rocking member at a point intersecting the longest axis thereof.

6. In a shaker conveyer, a pair of conveyer troughs, and a connection between said conveyer troughs whereby one trough may be reciprocably driven by the other at a different conveying action than the conveying action of said driving conveyer trough including a stationary frame forming a supporting guide frame for each of said conveyer troughs, a rocking member pivoted to said frame, for rocking movement about a vertical axis disposed to one side of said conveyer troughs, a link connecting one of said troughs with said rocking member at a point offset laterally from its longest axis, whereby said link may rock to opposite sides of a vertical plane extending longitudinally of said conveyer troughs and intersecting the axis of pivotal connection of said link to said trough, and a connection from said rocking member to said other conveyer trough.

7. In a shaker conveyer, a pair of conveyer troughs, and a connection between said conveyer troughs whereby one trough may be reciprocably driven from the other at a different conveying action than the conveying action of said driving conveyer trough including a stationary frame forming a supporting guide frame for each of said conveyer troughs, a rocking member pivoted to said frame for rocking movement about a vertical axis disposed to one side of said conveyer troughs, a link connecting one of said troughs with said rocking member at a point offset laterally from its longest axis, whereby said link may rock to opposite sides of a vertical plane extending longitudinally of said conveyer troughs and intersecting the axis of pivotal connection of said link to said trough, and a connection from said rocking member to said other conveyer trough including another rocking member pivoted to said frame, a connection between said rocking members, and a drive connection between said second rocking member and driven conveyer trough.

8. In a shaker conveyer, a pair of conveyer troughs, and a connection between said conveyer troughs, whereby one trough may be reciprocably driven from the other at a different conveying action than the conveying action of said driving conveyer trough including a stationary frame forming a supporting guide frame for each of said conveyer troughs, a rocking member pivoted to said frame, a link connecting said driving trough with said rocking member at a point offset laterally from its longest axis, a second rocking member pivoted to said frame, a connection between said rocking members and a drive connection between said second rocking member and driven conveyer trough.

9. In a shaker conveyer, a pair of conveyer troughs, and a connection between said conveyer troughs, whereby one trough may be reciprocably driven from the other at a different conveying action than the conveying action of said driving conveyer trough including a stationary frame forming a supporting guide frame for each of said conveyer troughs for reciprocable sliding movement therealong, a rocking member pivoted to said frame for movement about a vertical axis, a link connecting said driving trough with said rocking member at a point offset laterally from the longest axis thereof, and an operative connection from said rocking member to said other conveyer trough including a link pivoted to said rocking member at a point coincident with its longest axis.

10. In a shaker conveyer, a pair of conveyer troughs, and a connection between said conveyer troughs, whereby one trough may be reciprocably driven from the other at a different conveying action than the conveying action of said driving conveyer trough including a stationary frame forming a supporting guide frame for supporting each of said conveyer troughs for reciprocable sliding movement therealong, a rocking member pivoted to said frame for movement about a vertical axis, a link connecting one conveyer trough with said rocking member, and an operative connection from said rocking member to said other conveyer trough, said operative connection being at a point offset from the point of connection of said link to said rocking member.

11. In a shaker conveyer, a pair of conveyer troughs, and a connection between said conveyer troughs, whereby one trough may be reciprocably driven from the other at a different conveying action than the conveying action of said driving conveyer trough including a stationary frame forming a supporting guide frame for supporting each of said conveyer troughs for reciprocable sliding movement therealong, a roller frame movable along said supporting guide frame and forming a support for one of said conveyer troughs, another roller frame movable along said supporting guide frame and forming a support for said other conveyer trough, a rocking member pivoted to said frame, a link connecting said driving trough with said rocking member and an operative connection from said rocking member to said other conveyer trough, said operative connection being at a point offset from the point of connection of said link to said rocking member.

12. In a shaker conveyer, a pair of conveyer troughs, and a connection between said conveyer troughs, whereby one trough may be reciprocably driven from the other at a different conveying action than the conveying action of said driving conveyer trough including a stationary frame forming a supporting guide frame for supporting each of said conveyer troughs for reciprocable sliding movement therealong, a roller frame movable along said guide frame, a supporting connection between one of said conveyer troughs and said roller frame, another roller frame movable along said guide frame, a supporting connection between the other of said conveyer troughs and said roller frame, a trough section connecting said troughs together, a third roller frame supporting an end of said connecting trough, a longitudinally extending guide in the center of said last-mentioned supporting guide frame, a shoe depending from said third roller frame and engaging said longitudinally extending guide to prevent lateral displacement of said roller frame, a rocking member pivoted to said supporting guide frame, a link connecting said driving trough with said rocking member, and an operative connection from said rocking member to said other conveyer trough.

13. In combination with a shaker conveyer, a conveyer trough, a second conveyer trough, and a connection between said troughs whereby the second trough may be reciprocably driven by the first trough at a different conveying motion than the conveying motion of said first mentioned trough including a pair of parallel links a link connecting said parallel links together, a connection between one of said conveyer troughs and one of said parallel links for driving said parallel links, and a connection between said other parallel links and said second conveyer trough for reciprocably driving said second trough at a different conveying action than said first trough.

14. In combination with a shaker conveyer, a conveyer trough, a second conveyer trough and a connection between said troughs whereby the second trough may be reciprocably driven by the first trough at a different conveying motion than the conveying motion of said first-mentioned trough including a pair of parallel links, a connecting link connected to said conveyer trough and to one of said parallel links at a point spaced laterally from its longitudinal center line and a connecting link connected from said second conveyer trough to said second parallel link at a point spaced laterally from its longitudinal center line.

15. In combination with a shaker conveyer, a conveyer trough, a second conveyer trough, and a connection between said troughs whereby the second trough may be reciprocably driven by the first trough at a different conveying motion than the conveying motion of said first-mentioned trough including a pair of parallel links, a connecting link connected to said conveyer trough and one of said parallel links at a point spaced laterally from its longitudinal center line, and a second connecting link connected from said other parallel link at a point spaced laterally from its longitudinal center line in a direction opposite to the direction the point of connection of said first-mentned connecting link is spaced from the longitudinal center line of said first-mentioned parallel link.

WILLIAM W. SLOANE.